(12) United States Patent
Gmirya et al.

(10) Patent No.: US 8,459,413 B2
(45) Date of Patent: Jun. 11, 2013

(54) LUBRICATION SYSTEM WITH PROLONGED LOSS OF LUBRICANT OPERATION

(75) Inventors: Yuriy Gmirya, Woodbridge, CT (US); Mikhail Gelfand, Milford, CT (US)

(73) Assignee: Sirkorsky Aircraft Corporation, Stratford, CT (US)

( * ) Notice: Subject to any disclaimer, the term of this patent is extended or adjusted under 35 U.S.C. 154(b) by 711 days.

(21) Appl. No.: 12/522,268

(22) PCT Filed: Jan. 19, 2007

(86) PCT No.: PCT/US2007/060739
§ 371 (c)(1),
(2), (4) Date: Jul. 7, 2009

(87) PCT Pub. No.: WO2008/091341
PCT Pub. Date: Jul. 31, 2008

(65) Prior Publication Data
US 2010/0025159 A1 Feb. 4, 2010

(51) Int. Cl.
*F01M 1/20* (2006.01)
(52) U.S. Cl.
USPC .......................................... 184/6.4; 184/6.22
(58) Field of Classification Search
USPC .......................................... 184/6.4, 6.2, 6.22
See application file for complete search history.

(56) References Cited

U.S. PATENT DOCUMENTS

| | | | |
|---|---|---|---|
| 3,550,725 A * | 12/1970 | Hegglin | 184/104.3 |
| 3,658,153 A * | 4/1972 | Berman | 184/6.3 |
| 4,128,140 A | 12/1978 | Riches | |
| 4,531,358 A * | 7/1985 | Smith | 60/39.08 |
| 4,583,416 A * | 4/1986 | Muller | 74/467 |
| 4,858,426 A | 8/1989 | Holcomb | |
| 4,976,335 A * | 12/1990 | Cappellato | 184/6.4 |
| 5,046,306 A | 9/1991 | Borre, Jr. | |
| 5,097,926 A * | 3/1992 | Duello | 184/6.4 |
| 5,115,887 A * | 5/1992 | Smith | 184/6.4 |
| 5,271,612 A * | 12/1993 | Yada et al. | 267/158 |
| 5,344,101 A * | 9/1994 | Francois | 244/17.11 |
| 5,465,810 A | 11/1995 | Peterson et al. | |

(Continued)

FOREIGN PATENT DOCUMENTS

| | | |
|---|---|---|
| DE | 2557888 | 6/1977 |
| EP | 0449696 | 10/1991 |
| EP | 1167859 | 1/2002 |
| WO | WO2006062885 A2 | 6/2006 |

OTHER PUBLICATIONS

Search Report and Written Opinion mailed on Aug. 26, 2008 for PCT/US2007/60739.

(Continued)

*Primary Examiner* — Michael Mansen
*Assistant Examiner* — Michael Riegelman
(74) *Attorney, Agent, or Firm* — Carlson, Gaskey & Olds

(57) ABSTRACT

A lubrication system includes an external pump system which pumps air out of the housing and develop negative pressure therein in response to a loss of lubrication condition. The negative pressure operates as an air lock to minimize or prevent lubricating oil loss from the housing while an internal lubrication system continues to distribute lubricating oil—which although now increasing in temperature—still operates to lubricate the gearbox components. For further ballistic tolerance, the housing is a compound housing that reduces or closes the penetration and further minimizes lubricating oil and negative pressure loss. The housing may be still further hardened by an armor layer.

24 Claims, 4 Drawing Sheets

U.S. PATENT DOCUMENTS

| | | | |
|---|---|---|---|
| 5,893,423 A | 4/1999 | Selfors et al. | |
| 6,016,993 A | 1/2000 | Maino et al. | |
| 6,374,797 B1 | 4/2002 | Fischer | |
| 6,394,387 B1 | 5/2002 | Mitrovic | |
| 6,463,819 B1 * | 10/2002 | Rago | 184/6.2 |
| 6,543,580 B1 | 4/2003 | Gathmann et al. | |
| 6,691,830 B2 | 2/2004 | Blanc et al. | |
| 6,817,448 B2 | 11/2004 | Maret et al. | |
| 6,938,585 B2 | 9/2005 | Schneider | |
| 7,114,764 B1 * | 10/2006 | Barsoum et al. | 296/193.07 |
| 7,118,336 B2 * | 10/2006 | Waddleton | 416/1 |
| 7,207,308 B2 | 4/2007 | Venhaus et al. | |
| 7,387,189 B2 * | 6/2008 | James et al. | 184/6.11 |
| 2002/0007982 A1 * | 1/2002 | Howard | 184/6.2 |
| 2002/0084146 A1 | 7/2002 | Itoh | |
| 2002/0148529 A1 | 10/2002 | Berndorfer et al. | |
| 2003/0000773 A1 | 1/2003 | Engler et al. | |
| 2004/0079589 A1 | 4/2004 | Schneider | |
| 2005/0150470 A1 * | 7/2005 | Al-Khateeb | 123/41.33 |

OTHER PUBLICATIONS

Notification of Transmittal of International Preliminary Report on Patentability mailed on Feb. 19, 2009 for PCT/US2007/60739.
European Search Report dated Feb. 17, 2010.

* cited by examiner

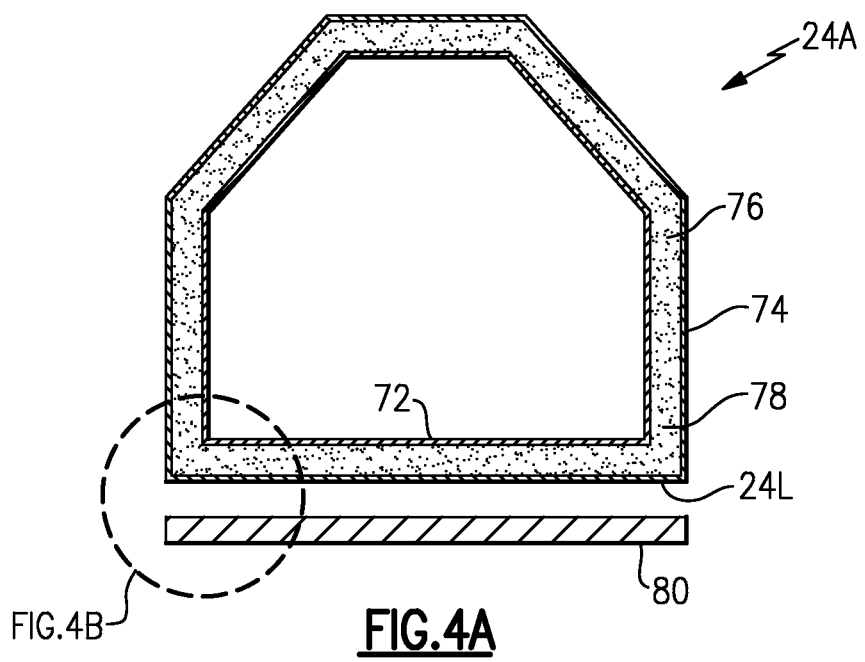
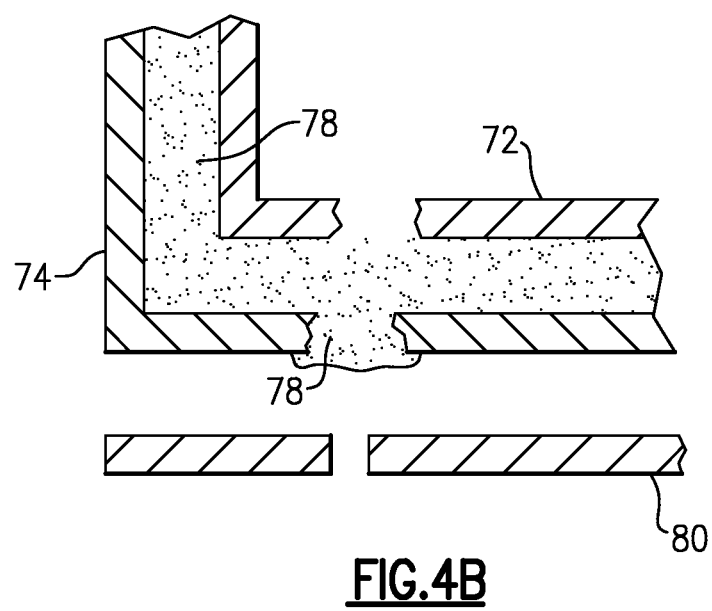

LUBRICATION SYSTEM WITH PROLONGED LOSS OF LUBRICANT OPERATION

This invention was made with government support under Contract No.: N00019-06-C-0081 awarded by the Department of the Navy. The government therefore has certain rights in this invention.

BACKGROUND OF THE INVENTION

The present invention relates to a lubrication system, and more particularly to a rotary-wing aircraft power transmission system having a lubrication system which provides prolonged loss of lubricant (LOL) operation.

Rotary-wing aircraft power transmission systems incorporate a multitude of gears and bearings which are subject to heat, sliding and surface wear. Such conditions are significantly increased during loss of lubricant (LOL) operating conditions caused by, for example, ballistic damage, pump failure and system leaks. The primary components of a power transmission system which may be failure points under LOL conditions include bearings and gears which are constantly oil lubricated under normal conditions using pressurized oil jets or splash oil lubrication methods.

The United States Department of Defense (U.S. DoD) currently imposes a requirement that all rotary-wing aircraft power transmission systems operate for a predetermined period of time in a LOL condition. The requirement includes the capability to maintain flight operations for a relatively short time period such as 30 minutes during the LOL condition, albeit at reduced power levels, typically sufficient only to sustain level flight operations.

Various conventional emergency or auxiliary lubrication systems are known and practiced. Duplicate lubricating wicks and jets have been provided for lubricating individual components along with an auxiliary pump system. Air aspirated nozzles have also been utilized for delivering a stream of oil to each individual component. Even through relatively effective, these existing systems may result in additional weight, complexity, and design envelope, yet still not completely satisfy certain LOL requirements.

Accordingly, it is desirable to provide a lubrication system which facilitates operation of a power transmission system for a prolonged time period under LOL conditions.

SUMMARY OF THE INVENTION

The lubrication system according to the present invention includes an external lubrication communication system, an internal lubrication system, a heat exchanger system and a divided housing which defines a cold oil sump and a hot oil sump.

In operation, lubricating oil is circulated from the cold oil sump to pressurized oil jets with the internal lubrication communication system to lubricate gearbox components. The lubricating oil is then collected in the hot oil sump. The external lubrication communication system communicates heated lubricating oil from the hot oil sump through the heat exchanger system to extract thermal energy from the heated lubricating oil for return to the cold oil sump. Circulation continues throughout normal operational conditions.

Should a loss of lubricant condition occur, for instance ballistic damage to the housing, the controller will recognize a pressure drop and close a breather valve to seal the housing. The controller will also open a heat exchanger valve system such that the external lubrication communication system will release lubricating oil from the hot oil sump until the intake line within the hot oil sump becomes open to air within the housing. From this point forward, the external pump system pumps air out of the housing and develop negative pressure therein. The negative pressure essentially operates as an air lock to minimize or prevent lubricating oil loss from the housing while the internal lubrication system continues to distribute lubricating oil—which although now increasing in temperature over operational time—still operates to lubricate gearbox components and maintain operation.

For further ballistic tolerance, the housing is a compound housing that includes an inner housing and an outer housing which defines a gap filled with a thick resilient material. The resilient material will flow into a penetration of the housing to reduce or close the penetration and further minimize lubricating oil and negative pressure loss.

The housing may be still further hardened by an armor layer located at least adjacent a lower section of the housing.

The lubrication system provides a power transmission system with a significant time period under which the transmission system will operate under a LOL condition.

The present invention therefore provides a lubrication system which facilitates operation of a power transmission system for a prolonged time period under oil-out conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIGS. 4A and 4B are schematic diagrams of a dual housing prior (FIG. 4A) and subsequent (FIG. 4B) to a penetration event.

DETAILED DESCRIPTION OF THE PREFERRED EMBODIMENT

Figure 1:
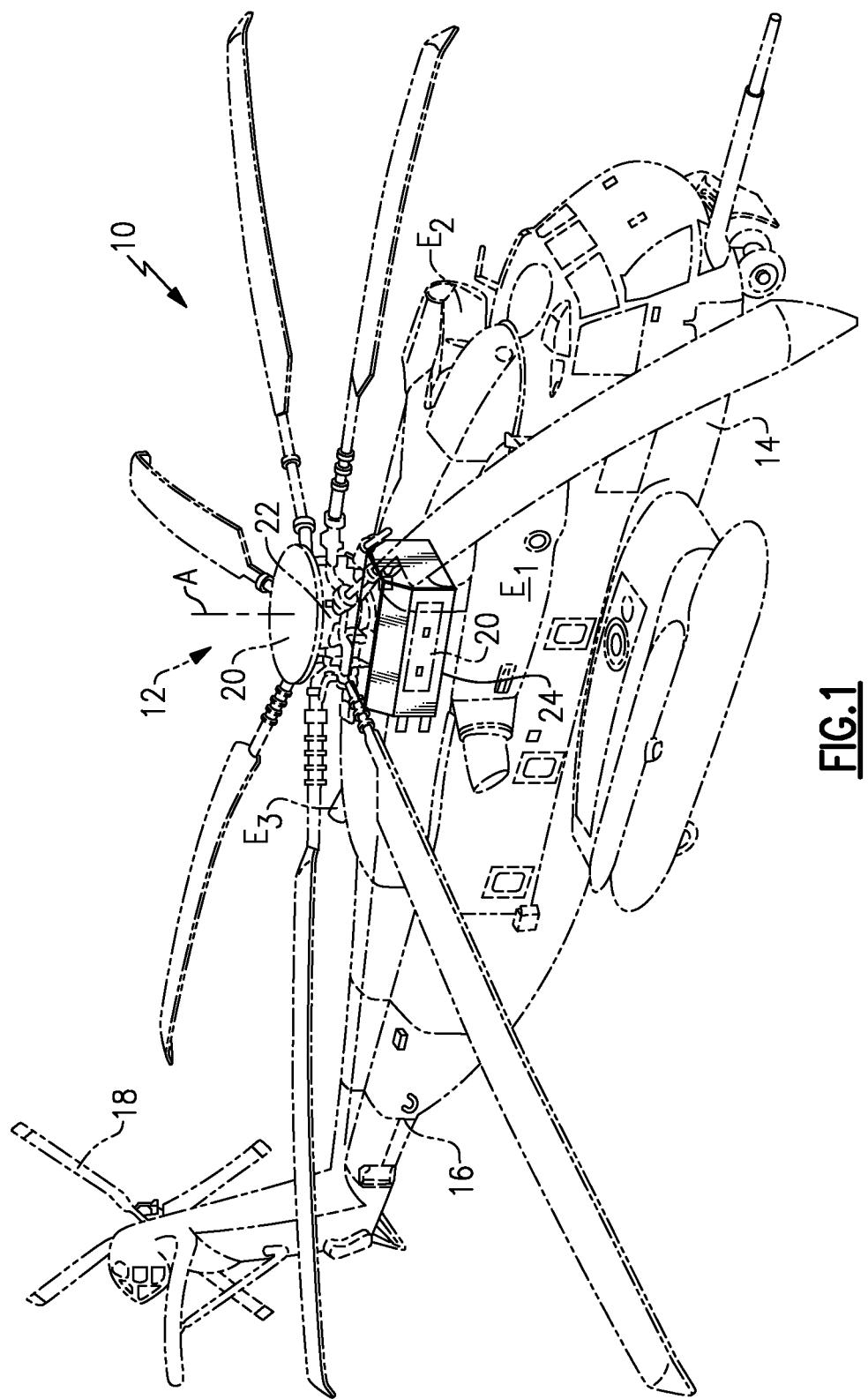
FIG. 1 is a general perspective view an exemplary rotary wing aircraft embodiment for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven through a main power transmission gearbox (illustrated schematically at 20) by one or more engines E. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, and such like will also benefit from the present invention.

The main power transmission gearbox 20 carries torque from the engines E through a multitude of gear train paths to a main rotor shaft 22 of the main rotor system 12. The gearbox 20 is preferably located within a housing 24 which may at least partially support the main rotor shaft 22. The invention described herein is best illustrated by reference to the illustrated rotary-wing aircraft main power transmission gearbox having highly-loaded torque transmitting gears, bearings and shafts, however, it will be appreciated that the inventive teachings are applicable to any system which may require oil-out or loss of lubricant (LOL) operation.

Figure 2:
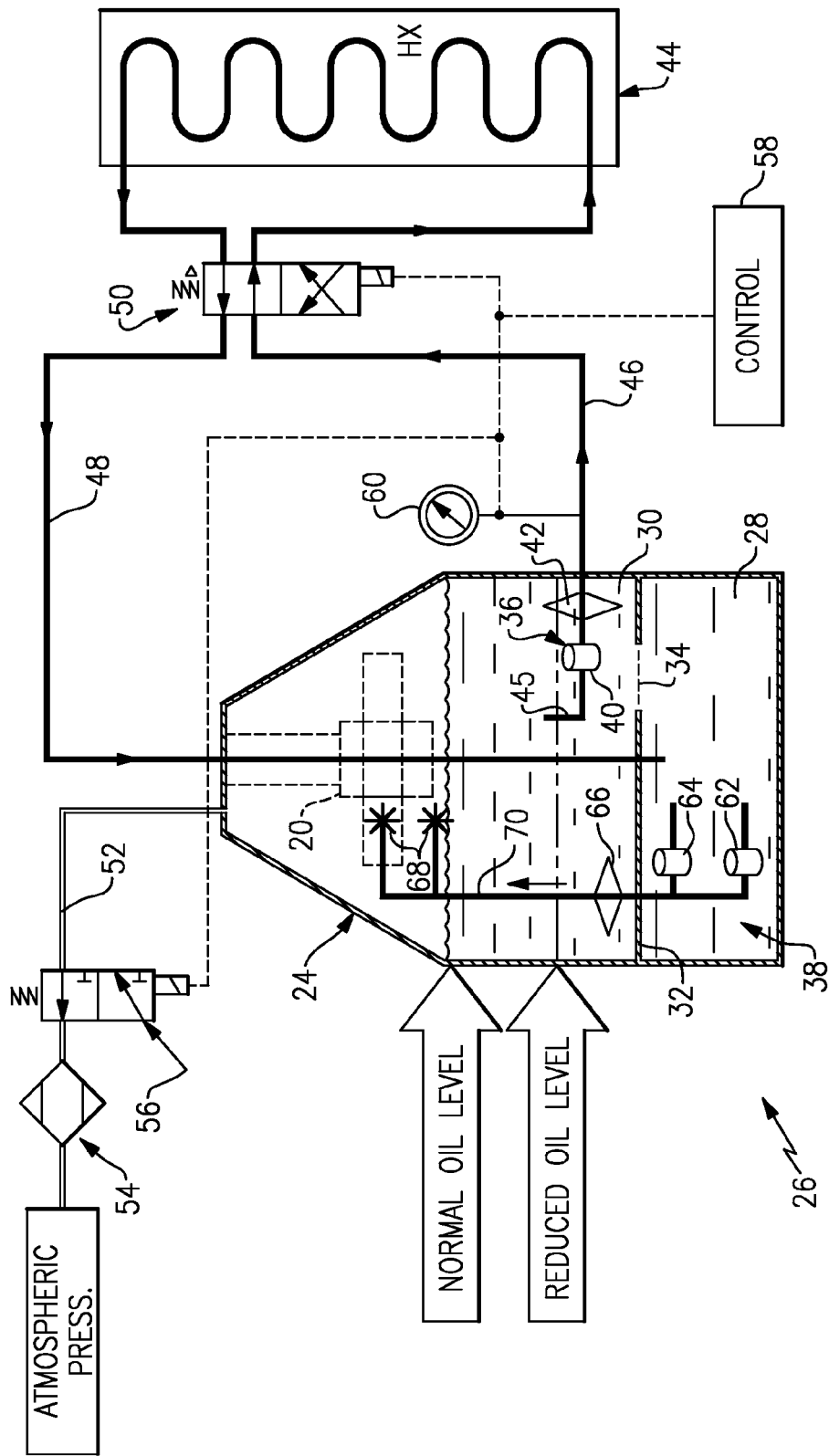
FIG. 2 is a schematic diagram of a lubrication system.

Referring to FIG. 2, a lubrication system 26 communicates lubricating oil to the power transmission gearbox 20 within the housing 24. The housing 24 generally includes a cold oil sump 28 and a hot oil sump 30. The terms cold and hot should be understood as relative terms in which the cold oil sump 28 contains lubricant oil which is generally at a lesser temperature than the cooling oil contained within the hot oil sump 30 during normal operational conditions. The lubrication oil within the hot oil sump 30 is at an elevated temperature from receipt of thermal energy from the gearbox 20. Various lubricating oils may be used herewith, such as, for example, DOD-L-85734 or MIL-PRF-23699.

A divider 32 separates the housing 24 into the cold oil sump 28 and the hot oil sump 30. Lubricating oil within the hot oil sump 30 is interchanged with lubricating oil within the cold oil sump 28 during normal operational conditions of the lubricating system 26. That is, the lubricating oil is circulated through the cold oil sump 28 such that the lubricating oil contained therein is refreshed yet always maintained in an essentially filled condition during normal operation. A separator 34 permits communication of the lubricating oil from the hot oil sump 30 to the cold oil sump 28 while preventing significant debris from entering the cold oil sump 28. It should be understood that the separator 34 may also be utilized to control the flow rate from the hot oil sump 30 to the cold oil sump 28. It should also be understood that the separator may be any filter or screen type member which permits lubricating oil therethrough yet screens shavings and debris from damaged components of the power transmission gearbox 20 and the like from entering the cold oil sump 28.

The lubrication system 26 further includes an external lubrication communication system 36 and an internal lubrication communication system 38. The external lubrication communication system 36 generally includes an external pump system 40 and a filter system 42 which communicate with the hot oil sump 30. The pump system 40 communicates the lubricating oil from an intake line 45 within the hot oil sump 30 to a heat exchanger system 44 though a hot communication line 46 which extends outside of the housing 24. The heat exchanger system 44 extracts thermal energy from the lubricating oil and communicates the lower temperature lubricating oil into the cold oil sump 28 though a cold communication line 48. The cold communication line 48 preferably passes through the housing 24 and divider 32. Various communication paths, pump systems, heat exchanger systems and the like may alternatively or additionally be utilized to reduce the temperature of the lubricating oil and communicate the lubricating oil from the hot oil sump 30 to the cold oil sump 28. It should also be understood that the pump system may be located in various locations external and internal the housing 24, however, internal is preferred to further facilitate protection of the systems from ballistic damage.

The hot communication line 46 and the cold communication line 48 preferably communicate through a heat exchanger valve system 50 such as a 4/2 solenoid valve interposed between the housing 24 and the heat exchanger system 44. A breather line 52 communicates atmospheric pressure with the housing 24 with a breather system 54. A breather valve 56 is located within the breather line 52 to selectively close the housing from atmospheric pressure. A controller 58 communicates with the heat exchanger valve system 50 and the breather valve 56 as well as a pressure sensor 60 which is preferably in communication with the hot communication line 46.

The internal lubrication system 38 generally includes a primary pump system 62, a secondary pump system 64 and a filter system 66 which communicate with the cold oil sump 28. The primary pump system 62 and the secondary pump system 64 are preferably provided for redundant operation and are located within the cold oil sump 28. It should be understood that other pump systems may likewise be utilized herewith.

The internal lubrication system 38 communicates relative low temperature lubricating oil from the primary pump system 62 and the secondary pump system 64 to components of the power transmission gearbox 20 such as gears, bearings and shafts which are constantly oil lubricated under normal conditions using pressurized oil jets 68 (illustrated schematically). The primary pump system 62 and the secondary pump system 64 communicate the lower temperature cooling oil to the oil jets 68 though a distribution line 70 which typically includes a multiple of branches to position each oil jet 68 adjacent each gearbox component to be lubricated. It should be understood that various oil distribution systems such as oil jets, splash oil lubrication methods, drip tanks, mist systems and such like utilized to distribute oil to particular locations throughout the housing 24 may alternatively or additionally be utilized. Notably, the internal lubrication system 38 avoids the heretofore necessity of an auxiliary lubrication system which typically requires at least some duplication of oil jets, distribution lines, and oil pump systems.

After distribution from the pressurized oil jets 68, the lubricating oil which has received thermal energy from the power transmission gearbox 20, is collected within the hot oil sump 30. From the hot oil sump 30 the lubricant is communicated primarily through the external lubrication communication system 36, however, the separator 34 assures the cold oil sump 28 remains filled.

Figure 3A:
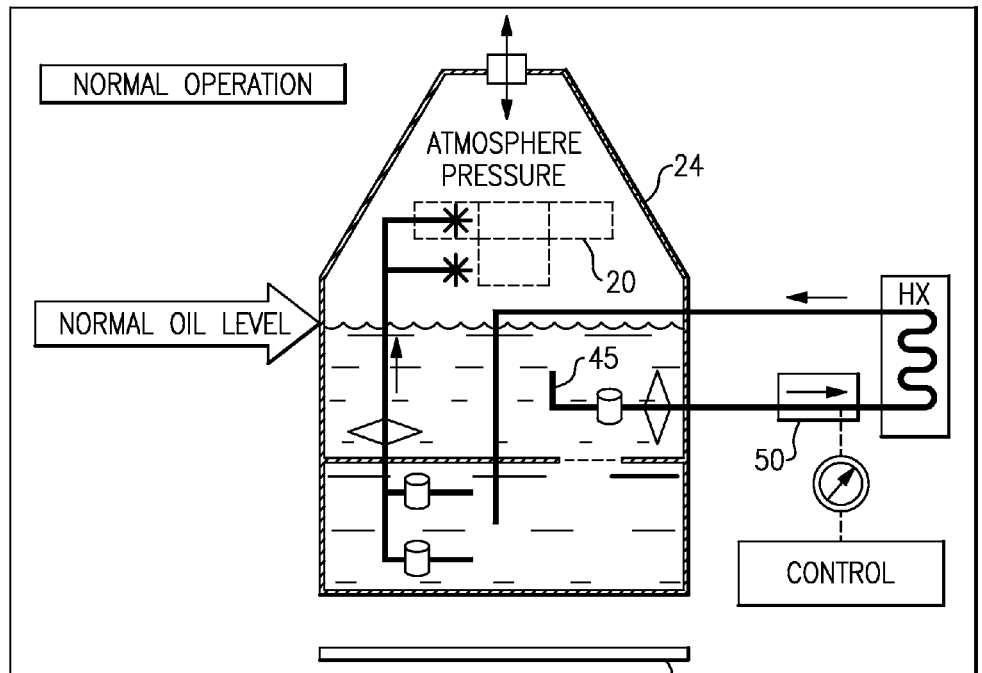
FIGS. 3A and 3B are schematic diagrams of the lubrication system in a normal operational (FIG. 3A) and LOL condition (FIG. 3B)

In operation, lubricating oil is circulated from the cold oil sump 28 to the pressurized oil jets 68 with the internal lubrication system 38 to lubricate the gearbox 20 and is then collected in the hot oil sump 30. The external lubrication communication system 36 communicates heated lubricating oil form the hot oil sump 30 through the heat exchanger system 44 to extract thermal energy from the heated lubricating oil and returned to the cold oil sump 28. Such circulation continues throughout normal operational conditions (FIG. 3A).

Figure 3B:
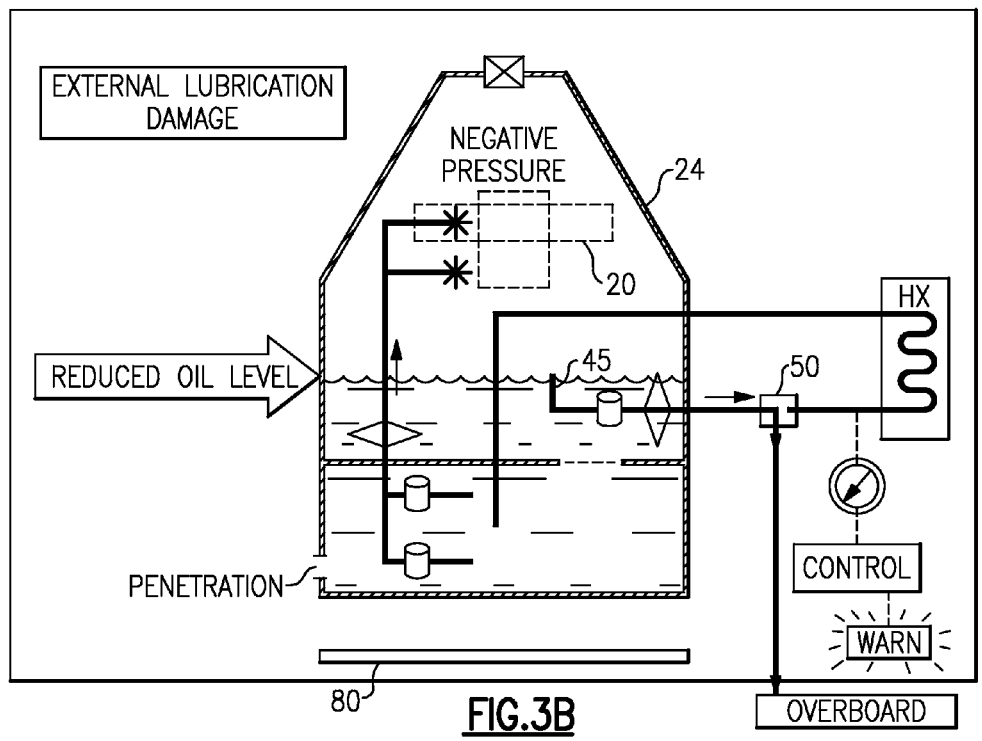

Should a loss of lubricant condition occur, for instance ballistic damage to the housing 24, the controller 58 will recognize a pressure drop with the pressure sensor 60. The controller 58 will then close the breather valve 54 to seal the housing 24 and open the heat exchanger valve system 50 such that external lubrication communication system 36 will release lubricating oil from the hot oil sump 30 overboard until the intake line 45 within the hot oil sump 30 becomes open to air within the housing 24 (FIG. 3B). That is, the intake line 45 is located within the hot oil sump 30 below a normal operational lubricating oil level but defines the reduced lubricating oil level as the additional lubricating oil has been pumped overboard. The controller 58 will also preferably issue a "LOL" warning signal.

From this point forward, the external pump system 40 pumps air out of the housing 24 and develop negative pressure therein. The lubricating oil within the housing 24 is thereby at least partially supported by the negative pressure within the housing 24 which will slow lubricating oil leakage from the housing 24. That is, the negative pressure essentially operates as an air lock to minimize or prevent lubricating oil loss from the housing 24 while the internal lubrication system 38 continues to distribute lubricating oil—which although now increasing in temperature over operational time—still operates to lubricate the gearbox 20 and maintain operation.

For further ballistic tolerance, the housing 24 may additionally be a compound housing 24A (FIG. 4A). The compound housing 24A includes an inner housing 72 and an outer housing 74 which defines a gap 76 therebetween. The gap 76 is filled with a thick resilient material 78 such as an asphalt type material which will flow into a penetration of the housing 24A (FIG. 4B) to reduce or close the penetration to further minimize lubricating oil and negative pressure loss. The housing 24 may be still further hardened by an armor layer 80 which is most preferably located at least adjacent a lower section 24L of the housing 24.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A lubrication system to lubricate moving components comprising:
   a housing defining a hot oil sump and a cold oil sump;
   a heat exchanger system;
   an external lubrication communication system to communicate a lubricating oil from said hot oil sump to said cold oil sump though said heat exchanger system;
   an internal lubrication communication system to communicate the lubricating oil from said cold oil sump to the moving components;
   a breather valve in communication with said housing, said breather valve in communication with said housing and atmospheric pressure; and
   a controller to selectively close said breather valve and seal said housing from atmospheric pressure in response to a loss of lubricant condition indicated by a pressure sensor such that said external lubrication communication system develops a negative pressure within said housing.

2. The system as recited in claim 1, wherein the lubricating oil within said cold oil sump is received and interchanged from said hot oil sump during a normal operational condition.

3. The system as recited in claim 1, wherein said external lubrication communication system includes an external pump system within said hot oil sump.

4. The system as recited in claim 3, wherein said external pump system includes an intake line within said hot oil sump.

5. The system as recited in claim 4, wherein said external pump system communicates lubricating oil from said hot oil sump to said heat exchanger system, through a hot communication line to extract thermal energy from said lubricating oil, then communicates said lower temperature lubricating oil into said cold oil sump through a cold communication line.

6. The system as recited in claim 1, wherein said internal lubrication communication system includes an internal pump system within said cold oil sump.

7. The system as recited in claim 6, wherein said internal pump system communicates the lubricating oil to a multiple of oil jets within the housing.

8. The system as recited in claim 1, wherein said controller is in communication with a heat exchanger valve system.

9. The system as recited in claim 8, wherein said controller is in communication with said breather valve.

10. The system as recited in claim 8, wherein the pressure sensor is within a hot communication line between an external pump system and a heat exchanger.

11. The system as recited in claim 1, wherein said housing includes an inner housing and an outer housing which defines a gap therebetween, said gap filled with a resilient material.

12. The system as recited in claim 1, wherein said housing includes an armor layer.

13. The system as recited in claim 12, wherein said armor layer is adjacent to a lower surface of said housing.

14. The system as recited in claim 1, wherein said hot oil sump is located above said cold oil sump relative the moving components.

15. The system as recited in claim 1, wherein said hot oil sump is separated from said cold oil sump by a divider.

16. The system as recited in claim 15, wherein said divider wall includes a separator.

17. The system as recited in claim 1, wherein said housing includes a common divider wall between said cold oil sump and said hot oil sump.

18. A lubrication system to lubricate moving components comprising:
   a housing defining a hot oil sump and a cold oil sump;
   a breather valve in communication with said housing and atmospheric pressure; and
   a controller to selectively close said breather valve and seal said housing from atmospheric pressure in response to a loss of lubricant condition indicated by a pressure sensor such that a negative pressure within said housing is developed.

19. The system as recited in claim 18, wherein said hot oil sump is separated from said cold oil sump by a divider.

20. The system as recited in claim 19, wherein said hot oil sump is located between said cold oil sump and the moving components.

21. The system as recited in claim 18, wherein the moving components include a power transmission of a rotary wing aircraft.

22. The system as recited in claim 18, wherein the moving components drive a main rotor system of a rotary wing aircraft.

23. The system as recited in claim 18, including:
   a heat exchanger system;
   an external lubrication communication system to communicate a lubricating oil from said hot oil sump to said cold oil sump though said heat exchanger system; and
   an internal lubrication communication system to communicate the lubricating oil from said cold oil sump to the moving components, said external lubrication communication system operable to develop the negative pressure within said housing.

24. The system as recited in claim 18, wherein said housing includes a common divider wall between said cold oil sump and said hot oil sump.

* * * * *

UNITED STATES PATENT AND TRADEMARK OFFICE
CERTIFICATE OF CORRECTION

PATENT NO.        : 8,459,413 B2
APPLICATION NO.   : 12/522268
DATED             : June 11, 2013
INVENTOR(S)       : Yuriy Gmirya and Mikhail Gelfand It is certified that error appears in the above-identified patent and that said Letters Patent is hereby corrected as shown below:

ON THE TITLE PAGE:

The Assignee should read as follows:

(73) Assignee:  Sikorsky Aircraft Corporation
                Stratford, CT (US)

Signed and Sealed this
Twenty-ninth Day of April, 2014

Michelle K. Lee
*Deputy Director of the United States Patent and Trademark Office*